United States Patent
Henderson et al.

(10) Patent No.: US 6,945,554 B2
(45) Date of Patent: Sep. 20, 2005

(54) INFLATOR PRESS FIT HOUSING FOR INFLATABLE CURTAINS

(75) Inventors: David Henderson, Ogden, UT (US); Kurt Petersen, Wellsville, UT (US); James Clyde Coleman, North Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/227,689

(22) Filed: Aug. 26, 2002

(65) Prior Publication Data

US 2004/0036263 A1 Feb. 26, 2004

(51) Int. Cl.⁷ ............................................. B60R 21/16
(52) U.S. Cl. ............................... 280/728.2; 280/730.2
(58) Field of Search ........................... 280/730.2, 741, 280/728.2, 736

(56) References Cited

U.S. PATENT DOCUMENTS

| | | | |
|---|---|---|---|
| 5,197,756 A | * 3/1993 | Jarboe et al. | 280/728.1 |
| 5,356,175 A | * 10/1994 | Rose et al. | 280/728.2 |
| 5,503,426 A | 4/1996 | Lang et al. | 280/728.2 |
| 5,547,213 A | 8/1996 | Lang et al. | 280/728.2 |
| 5,556,130 A | 9/1996 | Fulmer | 280/741 |
| 5,582,423 A | * 12/1996 | Rion et al. | 280/728.2 |
| 5,611,563 A | * 3/1997 | Olson et al. | 280/728.2 |
| 5,620,200 A | 4/1997 | Garner et al. | 280/728.2 |
| 5,683,106 A | 11/1997 | Fulmer | 280/741 |
| 5,779,268 A | 7/1998 | Smith et al. | 280/741 |
| 5,826,904 A | 10/1998 | Ellis et al. | 280/737 |
| 5,833,266 A | 11/1998 | Bartoldus et al. | 280/743.1 |
| 6,044,557 A | 4/2000 | Smith et al. | 29/897.2 |
| 6,120,056 A | 9/2000 | Ryan et al. | 280/728.2 |
| 6,224,089 B1 | * 5/2001 | Uchiyama et al. | 280/728.2 |
| 6,247,723 B1 | 6/2001 | Bohn | 280/731 |
| 6,364,343 B1 | * 4/2002 | Slota et al. | 280/728.2 |
| 6,412,810 B1 | * 7/2002 | Wipasuramonton et al. | 280/730.2 |

* cited by examiner

Primary Examiner—David R. Dunn
(74) Attorney, Agent, or Firm—Sally J. Brown

(57) ABSTRACT

An airbag inflator housing for mounting an airbag inflator to a vehicle. The airbag inflator housing includes a press-fit inflator mount for engaging an outer surface of an airbag inflator and a bracket member attached to the inflator mount that is configured to be attached to a vehicle. The inflator housing may hold the inflator in a press-fit manner by having an inside diameter that is smaller than an outside diameter of the airbag inflator. Alternatively, the inflator housing may hold the inflator in a clearance-fit or slip-fit manner, in which the inside diameter is equivalent to or larger than an outside diameter of the airbag inflator. In these inflator housings, the inflator must be additionally secured by a weld, a set screw, crimping, adhesive, or another suitable method.

16 Claims, 4 Drawing Sheets

INFLATOR PRESS FIT HOUSING FOR INFLATABLE CURTAINS

BACKGROUND OF THE INVENTION

1. Field of the Invention

The present invention relates to housings for mounting airbag inflators used in vehicles. More specifically, the present invention relates to housings for mounting airbag inflators securely in a vehicle.

2. Description of Related Art

Safety belts are designed to protect the occupants of a vehicle during events such as automobile collisions. In low-speed collisions, the occupants are generally protected from impact with objects located inside the vehicle such as the windshield, the instrument panel, a door, the side windows, or the steering wheel by the action of the safety belt. In more severe collisions, however, even belted occupants may experience an impact with the car's interior. This generally happens because the momentum of the occupant is so great that impact occurs before a seatbelt can fully decelerate them.

Airbag systems were developed to supplement conventional safety belts by deploying into the space between an occupant and an interior object or surface in the vehicle. The airbag acts to decelerate the occupant, thus reducing the chances of occupant contact with the vehicle's interior.

These airbag systems typically consist of several parts joined in a module. Such modules include an airbag cushion, a sensor, and an airbag inflator. The airbag cushion is typically made of a thin fabric that is folded to fit into a compartment of a steering wheel, dashboard, roof rail, interior panel, or other space in a vehicle. The sensors detect sudden decelerations that are characteristic of an impact. The sensors are set to detect an impact of a predetermined intensity at which it would be desirable for the airbag to deploy.

Upon detection of an impact of sufficient severity, the sensors, or a control unit connected to the sensors, send an electrical signal to the inflator. The inflator uses one of many technologies, including pyrotechnics and pressurized gas, to produce a volume of an inflation gas. The inflation gas is channeled into the airbag, inflating it. An occupant of the vehicle then contacts the airbag, which absorbs the force of the occupant's impact. The inflation gas is vented out of openings in the airbag, deflating it and freeing the occupant to exit the vehicle.

Vehicle manufacturers and suppliers have developed side impact airbag systems to better protect vehicle occupants during side-impact collisions. These airbag systems generally include "inflatable curtains," which are designed to inflate during an accident to cover the windows, doors, and lateral surfaces of a vehicle. These systems are often mounted within a housing located in the vehicle over the doors.

Typical mounting schemes for inflatable curtains involve mounting the curtain along the edge of the roof of a vehicle. Curtains are often placed behind interior trim such as headliners, A/B/C pillar trim and even weather seals. Care must be taken when designing such mounting schemes to assure that when an airbag is inflated, it is able to properly displace the interior trim and deploy such that it is positioned to protect vehicle occupants. Inflation gas for inflatable curtains is provided by an inflator which is often mounted in the trim near the airbag.

Inflatable curtain airbag inflators have typically been secured to a vehicle by an inflator housing which almost entirely surrounded the inflator. These housings were often cylindrical in shape, and made of metal. Sometimes these housings had a set of radial ridges or rolled grooves on their inside faces to engage the ends of the inflator and prevent movement within the housing. The base end of the inflator was often also secured to the housing by crimping the housing to conform it to the shape and diameter of the base. The housing was then attached to the vehicle by clamps or other attachments. In combination, these measures helped to assure that the inflator would not be expelled from the housing during deployment of the airbag.

In recent years, movement has been made to reduce the size, weight, and material requirements of inflator housings. This has included the development of two-piece diffuser designs for airbag inflators. These designs allow an airbag cushion to be attached directly to the airbag inflator instead of requiring attachment to the housing. These diffuser designs thus render it possible to use less bulky inflator housings. Such designs may potentially provide a significant cost savings while also reducing the weight of the airbag module.

Such housing designs enclosing less than the entire inflator are more difficult to mount securely to a vehicle. This difficulty stems in part from instability caused by securing only one end of the airbag inflator. Such instability may be especially noticeable when the inflator has been activated and is discharging inflation gas.

Without having a large, substantial housing, it may be more difficult to properly anchor an inflator. Solutions to this problem generally require custom-sizing of the inflator housing using manual labor. Such solutions include clamping a bracket around a region of the inflator such as the base end, and manually tightening and attaching the bracket to provide sufficient clamping force to hold the inflator in place. This solution requires several manual steps. Such manual steps may add to the production and installation time required for use of the inflator housing. They may also increase the cost. Other common solutions also require additional parts and manual steps to attach an inflator to an inflator housing.

Accordingly, it would be an advancement in the art to provide an airbag inflator housing that rigidly holds an airbag inflator in place during storage and deployment. Additionally, it would be beneficial to provide an airbag inflator housing that is inexpensive to manufacture, simple to install, and is lighter in weight than currently used in airbag inflator housings. Such an airbag inflator housing is disclosed herein.

SUMMARY OF THE INVENTION

The apparatus of the present invention has been developed in response to the present state of the art, and in particular, in response to the problems and needs in the art that have not yet been fully solved by currently available airbag inflator housings. Thus, the present invention provides an inflator housing that rigidly holds an inflator in place while eliminating the cost and quality control issues associated with using fasteners, brackets, or other methods known in the art.

In accordance with the invention as embodied and broadly described herein, an airbag inflator housing is provided. The airbag inflator housing of the invention is configured to be attached to airbag inflator by the application of pressure. The housing is then configured to be mounted to a vehicle using methods known in the art. The airbag inflator housing generally includes an inflator mount and a bracket member attached to the inflator mount. The inflator mount portion is built to firmly grasp an airbag inflator. In turn, the bracket member is securely attached to the inflator mount, and is configured to be mounted to a vehicle.

The inflator mount portion of the inflator housing is configured to firmly grasp an airbag inflator, providing a press-fit. A press-fit is provided when aligning an end of the airbag inflator with the inflator mount portion of inflator housing and applying a pressure to the airbag inflator results in the insertion of the airbag inflator into the housing in a secure fashion. This may be accomplished by providing an inflator mount having an inside diameter smaller than the outside diameter of the inflator. In inflator mounts of this design, insertion of the inflator deforms the inflator mount sufficiently to permit its entry. A press-fit may also be provided using an inflator mount having an inside diameter larger than an outside diameter of the inflator. This is done by including a plurality of ridges on the interior face of the inflator housing. These ridges create an effective inside diameter that is smaller than the outside diameter of the inflator.

Inflator mounts according to the invention are generally tubular in structure, and may be constructed using a variety of methods. The invention discloses inflator housings having ring-shaped inflator mounts such as tubular inflator mounts, cup-shaped inflator mounts, and tubular inflator mounts with ridges positioned on an interior surface of the inflator mount which may be configured to engage an airbag inflator in a press-fit manner.

As briefly noted above, a first type of these inflator housings having ring-shaped mounts have tubular mounts designed to have an inside surface diameter smaller than an outside diameter of a portion of an airbag inflator such as the base end of an inflator. Such mounts may be manufactured in a variety of ways, including cutting the mount from a specially-sized tube, punching the mount from a sheet of material, machining the mount, and by other manufacturing means known in the art. In those housings having tubular mounts, the inflator is installed into the housing by the application of a force sufficient to expand the inflator mount to allow admission of the inflator into the housing.

The inflator housings of the invention may be configured to be attached to an inflator at an end of the inflator, or at other points of the inflator, including regions slightly inset from an end of the inflator, and regions in the center of the inflator. The inflator housings of the inventor may be constructed to be attached to a base end of an inflator. Alternatively, the housings may be configured to be attached to the outlet end of an airbag inflator.

Inflator housings of the invention may also include mounts having a cup-shape configured to be press-fit inflator housings. In such housings, an inside diameter of the mount is configured to be smaller than an outside diameter of a region of an inflator such as the inflator base. Such cup-shaped mounts may be manufactured by punching or other similar methods, allowing for careful sizing of the inflator mount to ensure proper press-fit engagement of the inflator. For proper installation, a force is similarly needed to insert the inflator into the inflator mount. Upon the exertion of such a force, the inflator mount engages the outer surface of the airbag inflator in a press-fit manner.

In yet other versions of the inflator housing, the inflator mount has an inside diameter that is slightly larger than an outside diameter of the airbag inflator. In order to provide a press-fit to properly engage the airbag inflator, the inflator mount may further include a plurality of ridges. These ridges render an effective inside diameter of the inflator mount slightly smaller than the outside diameter of the airbag inflator. As used herein, the term "effective inside diameter" is used to describe the diameter of a tubular region described by the tips of the ridges of the inside surface of the inflator mount. This effective inside diameter describes the region, analogous to the inside diameter of other embodiments of the inflator housing, that is contacted by an inserted airbag inflator, and which generally must be expanded, deflected, or deformed to allow entry of the airbag inflator.

In alternate airbag inflator housings of the invention, the inflator mount is configured to instead engage the outer surface of the airbag inflator in a slip-fit manner. In such inflator housings, the inflator mount may have an inside diameter that is larger than the outside diameter of the airbag inflator. In such airbag housings, the inflator mount must be attached to the outer surface of the airbag inflator by a supplemental method to assure proper attachment. Such supplemental methods may generally be selected from a group comprising welding, crimping, or using a set screw to retain the airbag inflator in the inflator mount.

In other versions of the inflator housing, the inflator mount may engage the outer surface of the airbag inflator in a clearance-fit manner. In these, the inflator mount may have an inside diameter that is substantially identical to the outside diameter of the airbag inflator. Such inflator housings with clearance-fit inflator mounts may require that the inflator mount be attached to the outer surface of the airbag inflator by a supplemental method such as welding, crimping, or using a set screw to retain the airbag inflator in the inflator mount. Such is also the case with airbag inflator housings which have an inside diameter that is slightly larger than the outside diameter of the airbag inflator.

The airbag inflator housings of the invention also include a bracket member attached to the inflator mount. This bracket member may be angled to properly position the airbag inflator when installed in a vehicle. Further, the bracket member may comprise a gusset to provide strength to the bracket member. Additionally, the bracket member may comprise a retention hook for hanging the airbag housing in a vehicle prior to installation.

The invention also includes methods of mounting an airbag inflator to a vehicle including the steps of attaching a diffuser end of an airbag inflator to a gas guide, attaching an airbag inflator housing comprising a press-fit inflator mount and a bracket member to an airbag inflator, and attaching the bracket member to the vehicle. These methods may be used with inflator mounts comprising ring-shaped mounts such as tubular mounts, cup-shaped mounts, and tubular mounts having internally-placed ridges.

The methods may also be used with inflator housings including slip-fit or clearance-fit inflator mounts. These methods include the steps of attaching a diffuser end of an airbag inflator to a gas guide; attaching an airbag inflator housing comprising a slip-fit inflator mount and a bracket member to an airbag inflator by the inflator mount; securing the slip-fit or clearance-fit inflator mount to the airbag inflator using a method such as welding, crimping, or using a set screw; and attaching the bracket member to the vehicle. These methods may also be used with inflator mounts comprising ring-shaped members, cup-shaped members, and tube-shaped members having ridges on an internal surface of the tube to provide an added measure of stability.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 4B, is not intended to limit the scope of the invention, as claimed, but is merely representative of presently preferred embodiments thereof.

Figure 1:
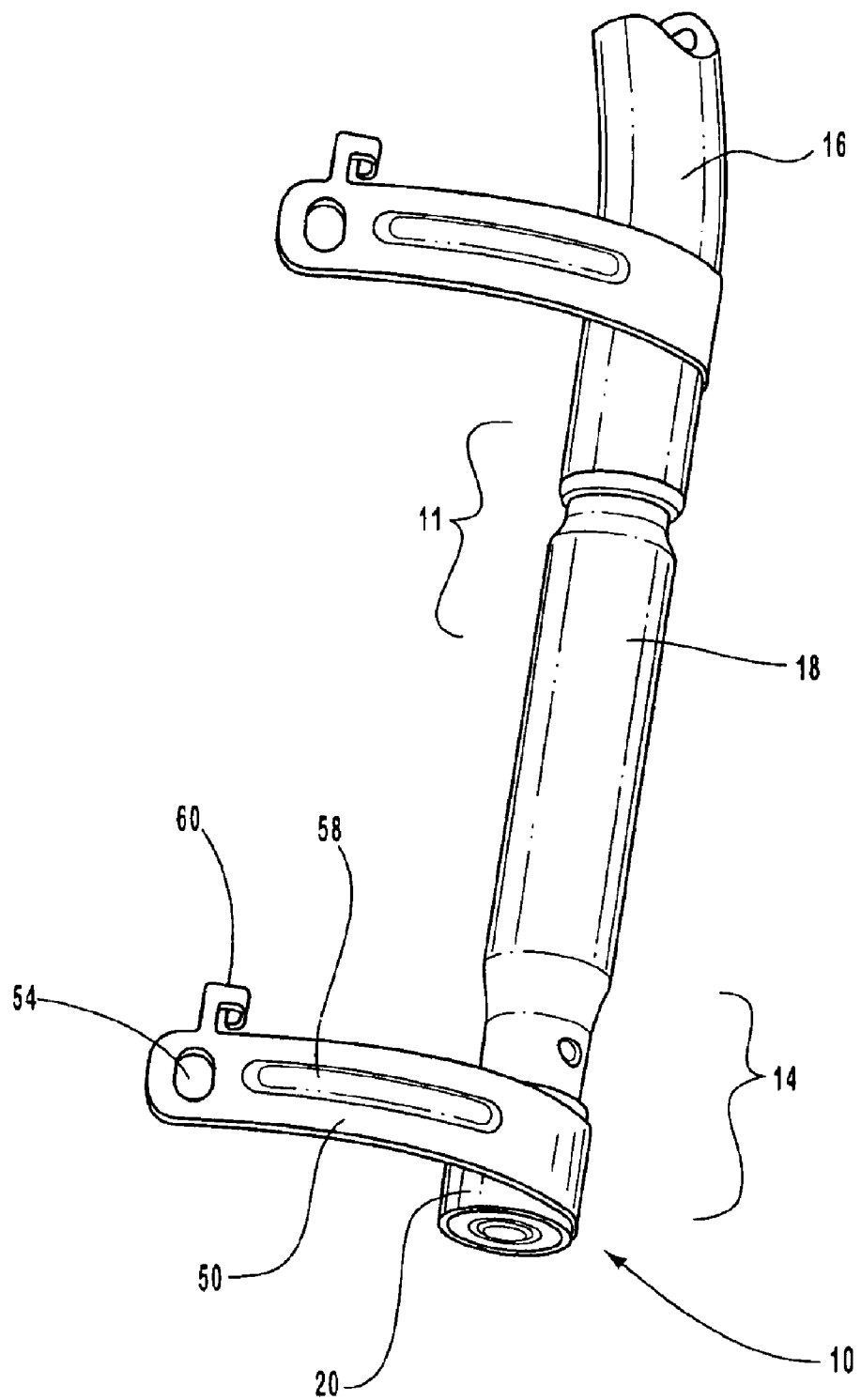
FIG. 1 is a perspective view of a press-fit inflator housing according to the invention shown attached to an inflator.

The invention comprises an inflator housing that provides a simple, easily-manufacturable, and inexpensive alternative to currently-used inflator housings. The inflator housing comprises an inflator mount for engaging an inflator and a bracket for attaching the housing to a vehicle. Referring now to FIG. 1, a first embodiment of the airbag inflator housing 10 according to the invention is shown. Here, the airbag inflator housing 10 is shown attached to an airbag inflator 18 which, in turn, is attached to a gas guide 16. The inflator housing 10 is shown here to comprise an inflator mount 20 and a bracket member 50. In this figure, the bracket member 50 is shown to comprise an arm having a mounting hole 54 and a retention hook 60. The bracket member 50 also includes a gusset 58 which adds strength to the bracket member 50.

The inflator mount 20 of the airbag inflator housing 10 is shown to be tubular in order to engage a region of the inflator 18 such as a base end 14 of the inflator 18 securely in a press-fit manner. This is accomplished in this embodiment by providing a tubular inflator mount 20 having an inside diameter that is slightly smaller than an outside diameter of a region of the inflator 18 such as the base end 14 of the inflator 18. To properly attach an inflator 18 to the inflator mount 20, a force must be applied to the inflator 18. This forces the inflator 18 into the mount 20, thus causing the mount 20 to expand sufficiently to allow entry of the inflator 18. This mechanism of assembly and configuration provides a press-fit capable of firmly holding the inflator 18 in place during storage and deployment of the airbag alike. A press-fit may be obtained using inflator housings of the invention using several embodiments of the inflator mounts of the invention. A first type of inflator mount is the tubular mount 20 as seen in FIG. 1. Other types of inflator mounts will be discussed in detail below.

Figure 2A:
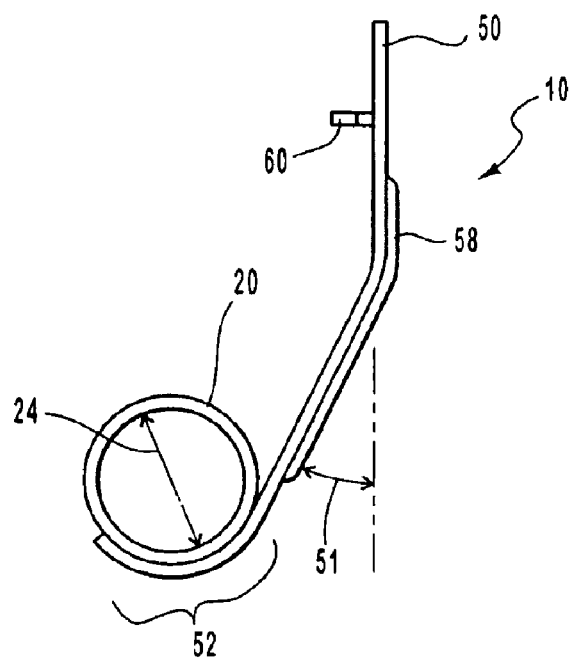
FIG. 2A is a cross-sectional view of the press-fit inflator housing of FIG. 1.
Figure 2B:
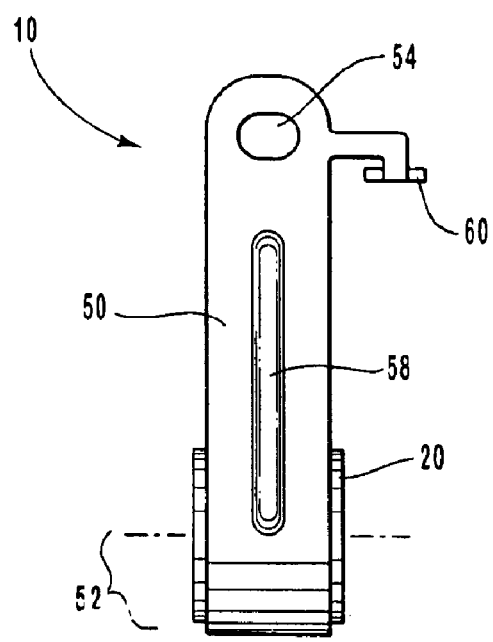
FIG. 2B is a perspective view of the press-fit inflator housing of FIG. 1.

Referring now to FIGS. 2A and 2B, the airbag inflator housing 10 of FIG. 1 is shown. In FIG. 2A, the inflator housing 10 is shown in cross-section from the side. From this view, the configuration of the inflator mount 20 of the housing 10 and the bracket member 50 are more clearly shown. In inflator housing 10, the inflator mount 20 is a tubular structure which engages the sides of an airbag inflator (not shown). The inflator mount 20 has an inside diameter 24 configured to be smaller than an outside diameter of the inflator (not shown).

In other embodiments of the invention, the tubular structure of the inflator mount 20 may have an inside diameter that is larger than an outside diameter of an airbag inflator 18. In such housings, the inflator 18 would be most effectively retained in the inflator housing 10 when an additional securing method is used such as welding the inflator 18 to a housing 10, using a set screw to hold the inflator 18 within the housing 10, adhering the inflator 18 to the inflator housing 10, or crimping the housing 10 to conform to the shape of the airbag inflator 18.

FIG. 2A further illustrates the bracket member 50 of the inflator housing 10 of the invention. The bracket member 50 is shown here from the side. In this configuration, the bracket member 50 is shown to be an angled arm attached to the inflator mount 20. The bracket member 50 also includes a gusset 58 that spans a length of the bracket member 50. In some embodiments, the gusset 58 spans the angle 51 of the bracket member 50. This may provide additional strength to the bracket member 50.

This bracket member 50 is also shown here to include a retention hook 60. This retention hook 60 may be provided as a convenience for use during the installation of the inflator housing 10. Specifically, this hook 60 allows the airbag housing 10 to be hung in a vehicle near its installation site prior to installation.

The bracket member 50 may be curved, as is shown in FIG. 2A, to properly position the airbag inflator 18 in the vehicle. Specifically, the shape of the bracket member 50 may, in part, be dictated by the shape of the regions of the vehicle in which the airbag inflator 18 is to be installed. Features such as the gusset 58 may be added within the scope of the invention for purposes such as providing sufficient strength to the bracket member 50 such that the airbag inflator 18 may be rigidly mounted to the vehicle.

The bracket member 50 is also shown to comprise an attachment region 52 by which the bracket member 50 is attached to the inflator mount 20. This attachment may be formed using a method such as welding, brazing, or others understood by those of skill in the art.

FIG. 2B is a back perspective view of the inflator housing 10 of FIG. 1. FIG. 2B further shows the relationship between the bracket member 50 and the inflator mount 20. In this embodiment, as discussed above, the bracket member 50 includes a mounting hole 54, a retention hook 60, and a gusset 58. In this figure, the ends of the inflator mount 20 are shown as they extend past the sides of the bracket member 50. A portion of the attachment region 52 is also visible.

Materials suited for use as in the inflator mounts of the invention include metals, alloys, and other materials that are capable of extending to a small extent to permit the entry of an airbag inflator into the mount 20. Such materials extend thus while retaining sufficient strength to provide a press-fit to the installed inflator and hold the inflator securely during storage and deployment. The tubular mount 20 may be manufactured by simply cutting it from a properly sized and configured tubular piece of metal or other suitable material. Alternatively, the mount 20 may be made using any of a number of methods known in the art such as punching.

Figure 3A:
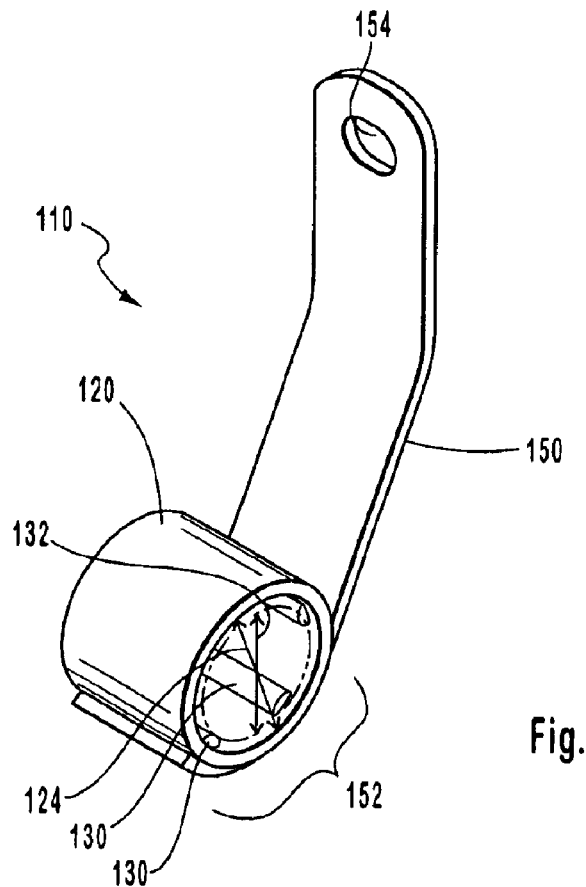
FIG. 3A is a perspective view of another press-fit inflator housing according to the invention.
Figure 3B:
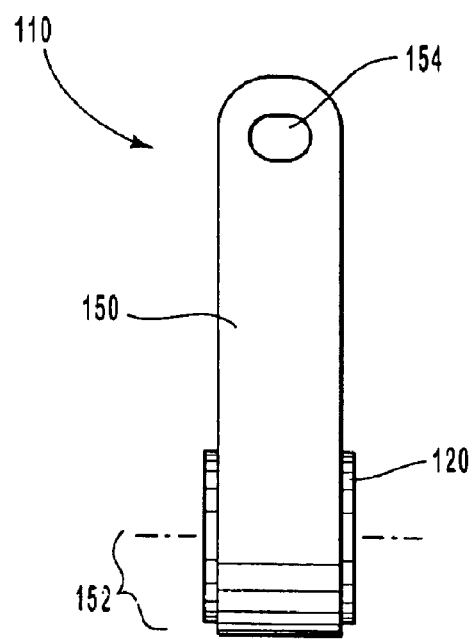
FIG. 3B is a perspective view of the press-fit inflator housing of FIG. 3A.

Referring now to FIGS. 3A and 3B, an alternative embodiment of the inflator housing 110 of the invention is shown in perspective. This inflator housing 110 includes an inflator mount 120 and a bracket member 150. Here, the inflator mount 120 is tubular in shape and has a plurality of raised ridges 130 on its interior surface. In this embodiment of the inflator housing 110, the inflator mount 120 has an inside diameter 124 that is larger than an outside diameter of a region of an inflator such as a base end of an inflator (not shown). The ridges 130, however, define a second inside diameter referred to as the "effective inside diameter" 132. This effective inside diameter 132 is configured to be slightly smaller than an outside diameter of a region of an inflator such as the base end of an inflator (not shown), thus providing a press-fit to assure proper mounting of the inflator. Since the ridges 130 are the only portions of the inside surface of the inflator mount 120 which actually contact the airbag inflator when mounted, the amount of force needed to properly set an airbag inflator inside the inflator mount 120 may be decreased. The ridges 130 also help to center an airbag inflator within the inflator mount 120.

The tubular mount 120 may be manufactured by simply cutting it from a properly sized and configured tubular piece of metal or other suitable material. Alternatively, the mount 120 may be made using any of a number of methods known in the art such as punching. The ridges 130 may be of the same material as the mount 120, and may be formed with the mount 120 using methods such as punching to produce a tubular mount 120 with ridges 130. The ridges 130 may alternatively be added later using methods such as welding, use of adhesives, and other methods known and used in the art. Additionally, the ridges 130 may be made of materials that differ from those of the mount 120 and attached to the mount 120.

FIGS. 3A and 3B further show the inflator housing 110 comprising a bracket member 150. This bracket member 150 is shown to be an angled element, which in this case does not include the gusset or retention hook shown in the embodiment of FIGS. 1, 2A, and 2B. As above, the bracket member 150 does, however, include an attachment region 152 which is attached to the inflator mount 120 by means such as welding, brazing, or other means known to those skilled in the art.

Figure 4A:
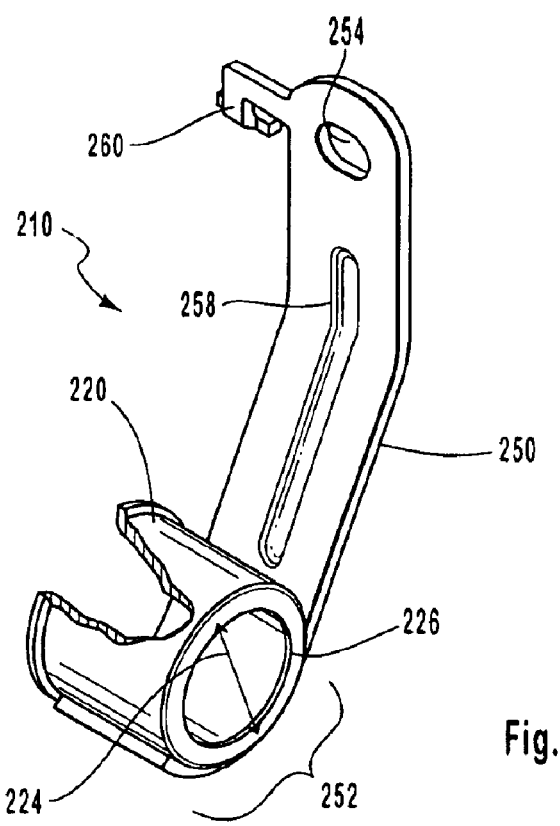
FIG. 4A is a partially cut away perspective view of yet another press-fit inflator according to the invention.
Figure 4B:
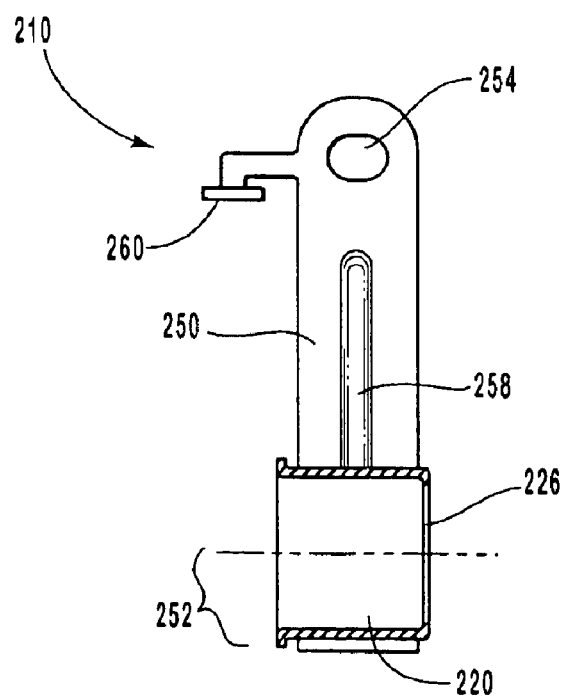
FIG. 4B is another partially cut away perspective view of the press-fit inflator of FIG. 4A.

FIGS. 4A and 4B show another alternative embodiment of the airbag inflator housing 210 of the invention. In this embodiment the inflator mount 220 is cup-shaped and has an open bottom 226. This inflator mount 220 may be stamped out of a piece of metal, and can be very accurately sized to provide a precise press-fit for an individual inflator. As above, the press-fit is provided by producing a cup-shaped inflator mount 220 having an inside diameter 224 that is slightly smaller than the outside diameter of an inflator (not shown).

Alternatively, the cup-shaped mount 220 may have an inside diameter 224 that is larger than an outside diameter of an inflator (not shown). In these embodiments of the invention, a variety of means are used to provide a press-fit for the installation of an airbag inflator. In some of these, the cup-shaped mount 220 may simply provide a clearance-fit or a slip-fit to an airbag inflator. As discussed above, such mounting methods require a supplemental method of retaining the airbag inflator in the inflator mount. With the inflator mount is cup-shaped or simply tubular, suitable supplemental methods may include adhesives, welding, or crimping.

Alternatively, the inflator mount of the housing may have ridges (not shown) as discussed in reference to the embodiment of FIGS. 3A, 3B. As in those embodiments, such an embodiment would include ridges on an inside surface of the inflator mount. The inside diameter of the inflator mount would be slightly larger than the outside diameter of the inflator. The ridges on the inside surface of the inflator mount would define an effective inside diameter smaller than the outside diameter of the inflator. As above, the ridges and/or the inflator mount itself will extend to allow installation of the inflator. This is done by the application of a force to the inflator.

The inflator mount may be manufactured using methods including stamping. Methods similar to those used with other airbag inflator housings of the invention may also be used. As in other embodiments of the invention, this inflator housing 220 is attached to a bracket member 250 at an attachment region 252. This attachment may be made as explained with regard to other airbag housings of the invention such as welding, use of adhesives, etc. The bracket member 250 is shown in FIG. 4B to include a mounting hole 254 and a retention hook 260. The bracket member 250 further includes a gusset 258, provided, as discussed above, to add strength to the bracket member 250.

In summary, the invention provides an airbag inflator housing suited for use with tubular airbag inflators. Specifically, the invention provides an airbag inflator housing that partially covers airbag inflator, yet provides secure mounting of the inflator to a vehicle. The inflator housings of the invention comprise an inflator mount for securely grasping an airbag inflator and a bracket member for attaching the inflator housing to a vehicle.

According to the apparatus of the invention, the inflator mount portion of the housing is generally tubular in shape. The inflator mount is configured in one of a variety of ways to be securely attached to an airbag inflator. The inflator mount preferably provides a press-fit to the inflator. In order to accomplish this, the inflator mount is sized to have an inside diameter that is slightly smaller than the outside diameter of the airbag inflator intended to be mounted. Thus, to mount an inflator in the housing, a force is applied to the airbag inflator, directing it into the mount, and gradually expanding the mount to accommodate the inflator.

In some versions of the inflator housing of the invention, the inside diameter of the inflator mount is larger than the diameter of the airbag inflator. A press-fit is provided by adding ridges to the inside surface of the inflator mount to create an effective inside diameter smaller than the diameter of the inflator. These ridges help to properly align the inflator when it is inserted, and the ridges deform, as may the entire inflator mount, to accommodate the inflator. In these versions of the invention, the inflator mount is generally tubular in shape, and may be cylindrical or cup-shaped, having ridges. As a result, it may be constructed in a variety of ways including cutting from a properly sized tube and adding the ridges using any means known in the art, including rolling. It may also be constructed by punching it from a sheet of suitable material.

The bracket member of the airbag housing of the invention may be angled, bent, or curved to properly position or align the airbag inflator when it is attached to the inflator housing and mounted in a vehicle. Additionally, the bracket member of the inflator housing of the invention may be provided with features to allow for proper attachment of the bracket to a vehicle, such as a mounting hole. The bracket member may also have features such as a retention hook as a convenience to allow the inflator housing to be positioned in a vehicle prior to installation.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An airbag inflator housing for securing an airbag inflator to a vehicle comprising:
   a one-piece, tubular inflator mount for engaging an outer surface of an airbag inflator, the inflator mount engaging the outer surface of the airbag inflator in a press-fit manner, the inflator mount having an inside diameter smaller than an outside diameter of the airbag inflator; and
   a single elongate, arm-shaped bracket member attached to the inflator mount, the bracket member being configured to be attached to a vehicle, wherein the bracket member comprises a retention hook.

2. The airbag inflator housing of claim 1, wherein the inflator mount comprises a ring-shaped member.

3. The airbag inflator housing of claim 1, wherein the inflator mount comprises a cup-shaped ring configured to receive an airbag inflator.

4. The airbag inflator housing of claim 1, wherein the inflator mount engages the outer surface of the airbag inflator in a press-fit manner, the inflator mount having an inside diameter that is larger than an outside diameter of the airbag inflator, and the inflator mount further including a plurality of ridges to render an effective inside diameter of the inflator mount smaller than the outside diameter of the airbag inflator.

5. The airbag inflator housing of claim 1, wherein the inflator mount engages the outer surface of the airbag inflator in a slip-fit manner, the inflator mount having an inside diameter that is larger than the outside diameter of the airbag inflator, the inflator mount further being attached to the outer surface of the airbag inflator by a method selected from a group comprising welding, crimping, or using a set screw to retain the airbag inflator in the inflator mount.

6. The airbag inflator housing of claim 1, wherein the inflator mount engages the outer surface of the airbag inflator in a clearance-fit manner, the inflator mount having an inside diameter that is substantially identical to the outside diameter of the airbag inflator, the inflator mount further being attached to the outer surface of the airbag inflator by a method selected from a group comprising welding, crimping, or using a set screw to retain the airbag inflator in the inflator mount.

7. The airbag inflator housing of claim 1, wherein the inflator mount has an inside diameter that is larger than the outside diameter of the airbag inflator, the inflator mount further including a set screw to retain the airbag inflator in the inflator mount.

8. The airbag inflator housing of claim 1, wherein the bracket member comprises a gusset.

9. An airbag inflator housing for securing an airbag inflator to a vehicle comprising:
   a press-fit inflator mount for securely engaging an outer surface of an airbag inflator, the inflator mount having an inside diameter smaller than an outside diameter of the airbag inflator; and
   a single elongate, arm-shaped bracket member attached to the inflator mount, the bracket member being configured to be attached to a vehicle, wherein the bracket member comprises a retention hook.

10. The airbag inflator housing of claim 9, wherein the inflator mount comprises a ring-shaped member.

11. The airbag inflator housing of claim 9, wherein the inflator mount comprises a cup-shaped member.

12. The airbag inflator housing of claim 9, wherein the inflator mount comprises a tubular member further comprising ridges positioned on an inside face of the inflator mount.

13. The airbag inflator housing of claim 9, wherein the bracket member comprises a gusset.

14. An airbag inflator housing for securing an airbag inflator to a vehicle comprising:
   a one-piece, tubular inflator mount for engaging an outer surface of an airbag inflator, the inflator mount having a length and having an inside diameter smaller than an outside diameter of the airbag inflator; and
   an elongate, arm-shaped bracket member attached to the inflator mount, the bracket member being configured to be attached to a vehicle and having a width substantially equal to the length of the inflator mount, wherein the bracket member comprises a retention hook.

15. The airbag inflator housing of claim 14, wherein the inflator mount comprises a ring-shaped member.

16. The airbag inflator housing of claim 14, wherein the bracket member comprises a gusset.

* * * * *